United States Patent
Vrhel et al.

(10) Patent No.: US 9,703,937 B2
(45) Date of Patent: Jul. 11, 2017

(54) METHOD TO PREVENT OPERATING SYSTEM DIGITAL PRODUCT KEY ACTIVATION FAILURES

(71) Applicant: Dell Products L.P., Round Rock, TX (US)

(72) Inventors: Thomas Vrhel, Woodinville, WA (US); Benjamin Brian Harry, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 1128 days.

(21) Appl. No.: 13/859,871

(22) Filed: Apr. 10, 2013

(65) Prior Publication Data

US 2014/0310816 A1 Oct. 16, 2014

(51) Int. Cl.

| | |
|---|---|
| *G06F 21/12* | (2013.01) |
| *G06F 21/50* | (2013.01) |
| *G06F 11/00* | (2006.01) |
| *G06F 21/10* | (2013.01) |
| *G06F 11/07* | (2006.01) |
| *G06F 9/44* | (2006.01) |

(52) U.S. Cl.
CPC .......... *G06F 21/121* (2013.01); *G06F 11/004* (2013.01); *G06F 11/07* (2013.01); *G06F 11/0763* (2013.01); *G06F 21/10* (2013.01); *G06F 21/50* (2013.01); *G06F 8/70* (2013.01)

(58) Field of Classification Search
None
See application file for complete search history.

(56) References Cited

U.S. PATENT DOCUMENTS

| 5,249,044 A | * | 9/1993 | Von Kohorn | ........ G06Q 20/387 |
| --- | --- | --- | --- | --- |
| | | | | 235/375 |
| 6,317,832 B1 | * | 11/2001 | Everett | ................... G06F 21/51 |
| | | | | 713/172 |
| 6,405,316 B1 | * | 6/2002 | Krishnan | ............ G06F 9/44521 |
| | | | | 713/190 |
| 6,543,047 B1 | * | 4/2003 | Vrhel, Jr. | ............ G06F 11/3672 |
| | | | | 714/E11.208 |
| 6,704,824 B1 | * | 3/2004 | Goodman | ............. G06F 13/385 |
| | | | | 703/24 |

(Continued)

*Primary Examiner* — Mamon Obeid
(74) *Attorney, Agent, or Firm* — Isidore PLLC (57) ABSTRACT

A method, an information handling system (IHS), and a computer program product initiates injection verification to determine whether a key injection procedure to support automated system activation within a target IHS was completed successfully. An injection verification module (IVM) compares a copy of a selected and limited character sequence for a unique digital product key (DPK) utilized during key injection to a character sequence reported by an operating system (OS) image on a selected, target IHS. If the selected character sequence matches the reported character sequence, the IVM identifies the selected information handling system as a "passing" system on which the key injection procedure was successfully performed. If the selected character sequence for the unique DPK does not match the reported character sequence, the IVM identifies the selected information handling system as a "failing" system on which the key injection procedure was not successfully performed.

20 Claims, 6 Drawing Sheets

(56) References Cited

U.S. PATENT DOCUMENTS

| | | | | |
|---|---|---|---|---|
| 6,735,757 B1* | 5/2004 | Kroening | G06F 8/63 | 717/120 |
| 6,779,134 B1* | 8/2004 | Laviolette | G06F 11/3006 | 714/38.12 |
| 6,819,133 B1* | 11/2004 | Kliesner | G11C 7/24 | 326/38 |
| 6,829,596 B1* | 12/2004 | Frazee | G06Q 20/0457 | 235/380 |
| 6,829,703 B1* | 12/2004 | Caswell | H04L 41/0869 | 713/1 |
| 6,901,537 B2* | 5/2005 | Dawkins | G06F 11/004 | 714/36 |
| 6,931,575 B2* | 8/2005 | Smith | G06F 11/2294 | 714/44 |
| 7,379,982 B2* | 5/2008 | Tabbara | G06F 8/60 | 709/220 |
| 8,433,923 B2* | 4/2013 | Yasaki | G06F 21/575 | 713/187 |
| 8,519,827 B2* | 8/2013 | Kim | G06K 7/0008 | 340/10.1 |
| 8,839,451 B1* | 9/2014 | Lam | G06F 21/10 | 713/193 |
| 8,893,105 B2* | 11/2014 | Dicker | H04L 67/34 | 717/168 |
| 8,977,842 B1* | 3/2015 | McCorkendale | G06F 21/53 | 380/285 |
| 9,053,216 B1* | 6/2015 | Coleman | G06F 11/302 | |
| 9,244,796 B2* | 1/2016 | Griffith | G06F 11/3006 | |
| 9,292,664 B2* | 3/2016 | Gordon | G06F 21/105 | |
| 2002/0161990 A1* | 10/2002 | Zhang | G06F 8/61 | 713/1 |
| 2003/0070174 A1* | 4/2003 | Solomon | H04H 20/28 | 725/98 |
| 2006/0059561 A1* | 3/2006 | Ronning | G06F 21/10 | 726/26 |
| 2008/0044026 A1* | 2/2008 | Walters | G06F 21/72 | 705/300 |
| 2008/0152144 A1* | 6/2008 | Douguet | H04L 9/004 | 380/277 |
| 2009/0281979 A1* | 11/2009 | Tysowski | G06F 3/0237 | 706/52 |
| 2009/0290716 A1* | 11/2009 | O'Connor | G06F 21/10 | 380/278 |
| 2009/0300735 A1* | 12/2009 | Wiesinger | G11B 20/00086 | 726/5 |
| 2010/0077465 A1* | 3/2010 | Chou | G06F 21/31 | 726/6 |
| 2010/0251346 A1* | 9/2010 | Dumais | G06F 21/10 | 726/5 |
| 2010/0314452 A1* | 12/2010 | Yeo | G06K 7/0008 | 235/492 |
| 2011/0010770 A1* | 1/2011 | Smith | G06F 21/71 | 726/18 |
| 2012/0102334 A1* | 4/2012 | O'Loughlin | G06F 21/57 | 713/189 |
| 2012/0136796 A1* | 5/2012 | Hammad | G06Q 20/12 | 705/67 |
| 2013/0031541 A1* | 1/2013 | Wilks | G06F 8/665 | 717/176 |
| 2013/0227303 A1* | 8/2013 | Kadatch | G06F 21/554 | 713/193 |
| 2013/0305394 A1* | 11/2013 | Nozue | G06F 21/57 | 726/30 |
| 2014/0052995 A1* | 2/2014 | Hu | G06F 21/45 | 713/184 |
| 2014/0177831 A1* | 6/2014 | Chou | G06F 21/83 | 380/44 |
| 2014/0250255 A1* | 9/2014 | Gordon | G06F 21/73 | 711/102 |
| 2014/0259165 A1* | 9/2014 | Bellahcene | G06F 21/83 | 726/22 |
| 2014/0310816 A1* | 10/2014 | Vrhel | G06F 21/121 | 726/26 |
| 2015/0271150 A1* | 9/2015 | Barnett | H04L 63/0435 | 713/171 |
| 2016/0036808 A1* | 2/2016 | Li | H04L 9/006 | 726/6 |
| 2016/0335555 A1* | 11/2016 | Llanes-Tosar | G06F 8/70 | |
| 2016/0360994 A1* | 12/2016 | Rettedal | A61B 5/02055 | |

* cited by examiner

| IHS ID | Target activation process type | Target OS product | Key Injection performed on IHS? | Activation Key(s) used for injection | Selected character sequence for product key(s) used for injection | Injection status |
|---|---|---|---|---|---|---|
| 1 | Manual: COA | PRODUCT1 | YES | 1. Default key | 1. ...xx-1B602 | PASS |
| 2 | Automated: DPK | PRODUCT1 | YES | 1 Unique DPK<br>2 Default DPK | 1. ...xx-24R02<br>2. ...xx-10384 | PASS |
| 3 | Automated: DPK | PRODUCT2 | YES | 1 Unique DPK<br>2 Default DPK | 1. ...xx-24502<br>2. ...xx-103W4 | FAIL |
| 4 | Automated: DPK | PRODUCT3 | YES | 1 Unique DPK<br>2 Default DPK | 1. ...xx-2H502<br>2. ...xx-10G74 | Unverified |
| 5 | Automated: DPK | PRODUCT4 | NO | 1 Unique DPK<br>2 Default DPK | 1. ...xx-24P02<br>2. ...xx-10R24 | N/A |

FIG. 6

METHOD TO PREVENT OPERATING SYSTEM DIGITAL PRODUCT KEY ACTIVATION FAILURES

BACKGROUND

1. Technical Field

The present disclosure generally relates to information handling systems (IHS) and in particular to operating system (OS) activation within information handling systems.

2. Description of the Related Art

Operating System Digital Product Key Activation is a process in which an operating system (OS), such as Windows, receives a unique Digital Product Key (DPK). The DPK is a character sequence having a particular length. For example, the DPK is commonly implemented as a sizeable character array. When a system is manufactured, the DPK is injected into the IHS. If the injection is successful, activation (i.e., DPK based activation) is possible at a customer's site. However, there are many failure modes, many of which are very difficult to detect for a number of reasons. It is difficult to detect failure modes since there is no tool to determine the operating system (OS) stock keeping unit (SKU) or product type (e.g., Product 1, Product 2, Product 3, Product 4) for a particular DPK. Furthermore, to enable the DPK activation process, one of a set of default manufacturing keys (i.e., one for each OS SKU) are injected into the OS image, to indicate that the DPK activation process is to be triggered. There are also default manufacturing keys to indicate that the DPK activation process should not be triggered and that a paper certificate of authentication (COA) will be used instead of the DPK process. Since a key is always present in the OS image, the challenge of detecting a missing DPK becomes more difficult. Furthermore, there is no way to directly query a system to determine whether the system will activate when the system reaches the customer, given that part of the process to enable activation doesn't occur until the customer accesses the system.

There is no provided way to query whether the SKU of the DPK matches the SKU of the OS image, or even whether a unique DPK has been successfully injected because a default manufacturing key must always be in the image.

BRIEF SUMMARY

Disclosed are a method, an information handling system (IHS), and a computer program product that initiates injection verification to determine whether a key injection procedure to support automated system activation within a target IHS was completed successfully. An injection verification module (IVM) compares a copy of a selected and limited character sequence for a unique digital product key (DPK) utilized during key injection to a character sequence reported by an operating system (OS) image on a selected IHS. If the selected character sequence matches the reported character sequence, the IVM identifies the selected information handling system as a "passing" system on which the key injection procedure was successfully performed. If the selected character sequence for the unique DPK does not match the reported character sequence, the IVM identifies the selected information handling system as a "failing" system on which the key injection procedure was not successfully performed.

According to another aspect, if the selected character sequence for the unique DPK does not match the reported character sequence, the method, IHS and computer program product compares the reported character sequence to a selected and limited character sequence for a default activation process key that corresponds to the unique DPK to determine a cause of a failure in the key injection of the selected IHS. Another aspect involves determining whether an IHS is being configured to enable device activation using a DPK automated activation process or a manual activation process.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, an information handling system (IHS), and a computer program product that initiates injection verification to determine whether a key injection procedure to support automated system activation within a target IHS was completed successfully. An injection verification module (IVM) compares a copy of a selected and limited character sequence for a unique digital product key (DPK) utilized during key injection to a character sequence reported by an operating system (OS) image on a selected or target IHS. If the selected character sequence matches the reported character sequence, the IVM identifies the selected information handling system as a "passing" system on which the key injection procedure was successfully performed. If the selected character sequence for the unique DPK does not match the reported character sequence, the IVM identifies the selected information handling system as a "failing" system on which the key injection procedure was not successfully performed.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

Figure 1:
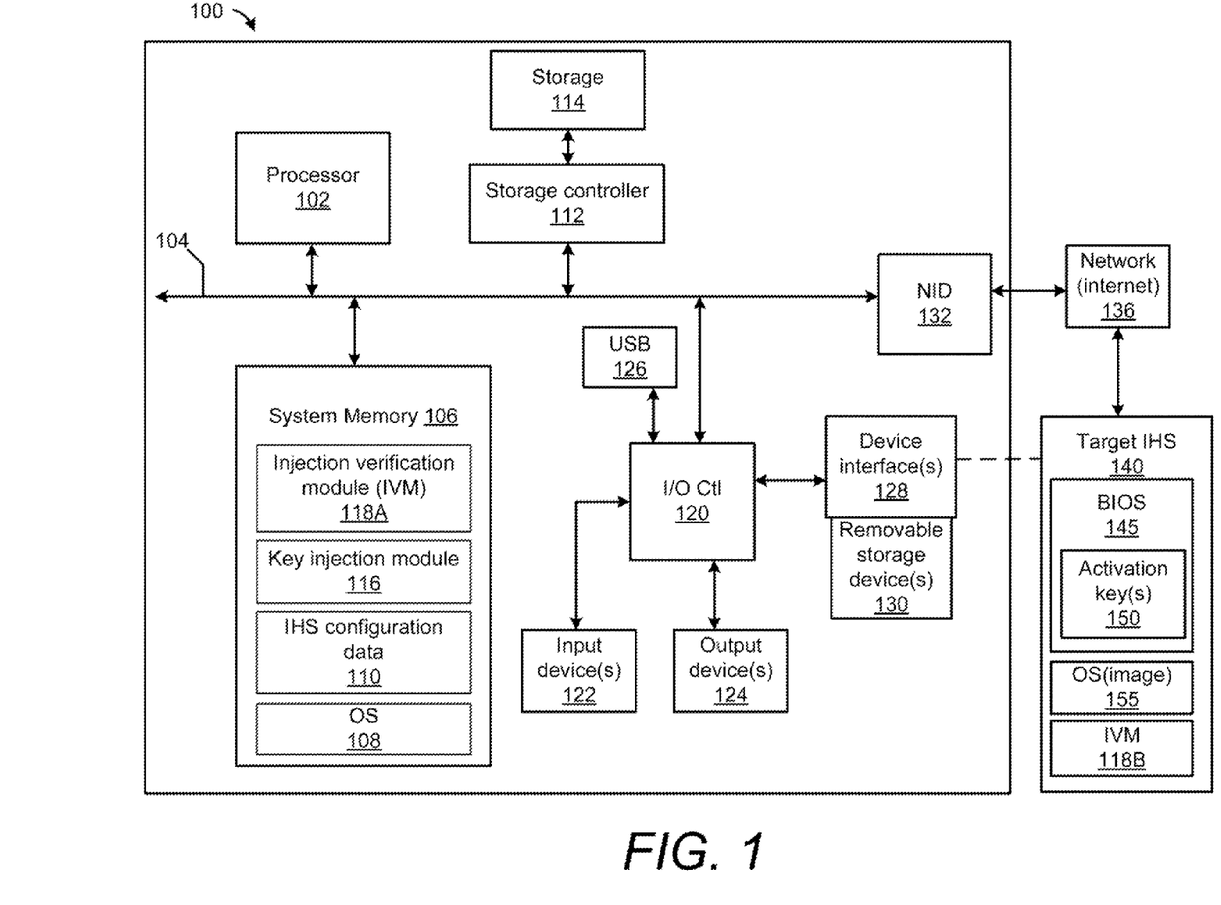
FIG. 1 illustrates an example information handling system (IHS) within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes one or more processor(s) 102 coupled to system memory 106 via system interconnect 104. System interconnect 104 can be interchangeably referred to as a system bus, in one or more embodiments. Also coupled to system interconnect 104 is a local storage controller 112 coupled to local storage 114 within which can be stored software and one or more sets of data (not specifically shown). As shown, system memory 106 can include therein a plurality of modules, including operating system (O/S) 108. In addition, system memory 106 includes IHS configuration data 110 and injection verification module (IVM) 118A. IHS configuration data 110 identifies a target OS, key injection information and key injection status for a selected IHS. IVM 118A determines whether key injection to support an automated activation process was successfully performed. In one embodiment, key injection module (KIM) 116 is also included within system memory 106. In one embodiment, system memory 106 includes firmware (not shown) and a Basic Input/Output System (BIOS) (not shown). The various software and/or firmware modules have varying functionality when their corresponding program code is executed by processor(s) 102 or other processing devices within IHS 100.

IHS 100 further includes one or more input/output (I/O) controllers 120 which support connection to and processing of signals from one or more connected input device(s) 122, such as a keyboard, mouse, touch screen, or microphone. I/O controllers 120 also support connection to and forwarding of output signals to one or more connected output device(s) 124, such as a monitor or display device or audio speaker(s). In addition, IHS 100 includes universal serial bus (USB) 126 which is coupled to I/O controller 120. Additionally, in one or more embodiments, one or more other device interface(s) 128, such as an optical reader, a second USB, a card reader, Personal Computer Memory Card International Association (PCMCIA) port, and/or a high-definition multimedia interface (HDMI), can be associated with IHS 100. Device interface(s) 128 can be utilized to enable data to be read from or stored to corresponding removable storage device(s) 130, such as a compact disk (CD), digital video disk (DVD), flash drive, or flash memory card. In one or more embodiments, device interface(s) 128 can also provide an integration point for connecting other device(s) to IHS 100. In one implementation, IHS 100 connects to target IHS 140 using device interface(s) 128. In such implementation, device interface(s) 128 can further include General Purpose I/O interfaces such as I²C, SMBus, and peripheral component interconnect (PCI) buses.

IHS 100 comprises a network interface device (NID) 132. NID 132 enables IHS 100 to communicate and/or interface with other devices, services, and components that are located external to IHS 100. These devices, services, and components can interface with IHS 100 via an external network, such as example network 136, using one or more communication protocols. In particular, in one implementation, IHS 100 uses NID 132 to connect to target IHS 140 via an external network, such as network 136.

Network 136 can be a local area network, wide area network, personal area network, and the like, and the connection to and/or between network 136 and IHS 100 can be wired or wireless or a combination thereof. For purposes of discussion, network 136 is indicated as a single collective component for simplicity. However, it is appreciated that network 136 can comprise one or more direct connections to other devices as well as a more complex set of interconnections as can exist within a wide area network, such as the Internet.

Figure 2:
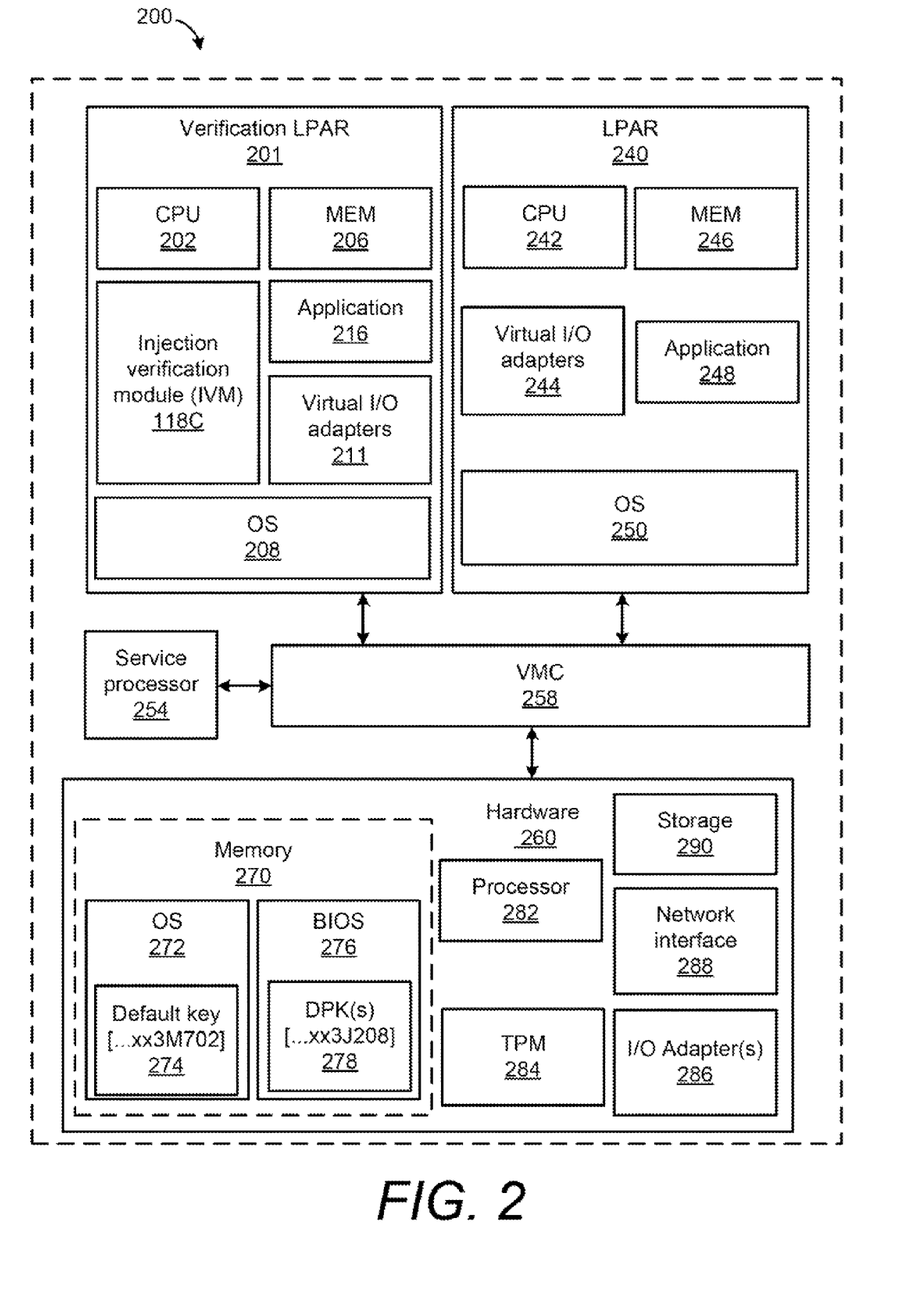
FIG. 2 illustrates a block diagram of an example IHS operating within a virtualized environment, in accordance with one or more embodiments.

Target IHS 140 comprises BIOS 145 which further comprises activation process key(s) 150. In addition, target IHS 140 comprises OS 155. In one embodiment, target IHS 140 also comprises IVM 118B which provides a local key injection verification platform. In one embodiment, activation process key(s) 150 is a digital process key (DPK) that was previously installed during a key injection procedure to enable support for an automated DPK activation process. In one embodiment, target IHS 140 is configured as a non-virtualized IHS. However, in another embodiment, target IHS 140 is configured as a virtualized IHS similar to IHS 200 (FIG. 2). As illustrated, in one embodiment, IVM 118A provides a remote verification platform within an external IHS 100. In another embodiment, IVM 118B provides a local verification platform on a target IHS 140. In one additional implementation, IVM 118C (FIG. 2) provides a local verification platform on a logical partition within target IHS 200. To simplify the description, except where specifically identified as IVM 118A, IVMB 118B and/or IVM 118C, references to the functionality associated with any one of the IVM implementations are generally referred to as "IVM 118" throughout the disclosure.

With specific reference now to FIG. 2, there is depicted a block diagram of another IHS, within which the functional aspects of the described embodiments may advantageously be implemented. IHS 200 comprises a plurality of user-level logical partitions (LPARs), of which a first two LPARs, verification LPAR 201 and target LPAR 240, are illustrated within IHS 200.

Hardware components 260 of IHS 200 comprise one or more processors 282, one or more memories 270, and local storage 290. In one embodiment, a trusted platform module (TPM) 284 is included within hardware components 260. Memory 270 comprises a number of operating systems, including OS 272, which includes default key 274. Memory 270 also comprises BIOS 276 which includes digital product key(s) (DPK) 278. The processors 282 are interconnected with one or a plurality of memories 270 and with local storage 290 via a bus, interconnect/switch or an interconnect fabric (not specifically shown). Also included within hardware components 260 are one or more network interfaces 288 and one or more I/O adapters 286 to enable IHS 200 and thus the other components (i.e., LPARs) of the IHS 200 to engage in network level communication. LPARs 201 and 240 utilize virtual I/O adapters 211 and 244 to communicate with other LPARs, within the same IHS or on a different IHS. I/O adapters 286 are physical adapters that enable IHS 200 to support I/O operations via an I/O interface with both locally connected and remotely (networked) connected I/O devices, including remote storage (not shown). IHS 200 is logically partitioned such that different I/O adapters 286 are virtualized and the virtual I/O adapters may then be uniquely assigned to different logical partitions.

Logically located above the hardware level (260) is a virtualization management component (VMC) 258, in one embodiment. While illustrated and described throughout the various embodiments as VMC 258, it is fully appreciated that other types of virtualization management components may be utilized and are equally applicable to the implementation of the various embodiments. VMC 258 has an associated service processor 254 coupled thereto within IHS 200. Service processor 254 may be used to provide various services for one or more logical partitions.

Verification LPAR 201 is configured to provide an internal verification platform to determine whether key injection was successfully performed on target IHS 200. Prior to sending target IHS 200 to a customer, verification LPAR 201 is removed from target IHS 200. Target LPAR 240 represents an example of an LPAR that can be configured within IHS 200. The LPARs are logical partitions of a virtualized (or operating system partitioned) computing system. LPAR 201 receives an allocation of specific virtualized hardware and OS resources, including virtualized allocations of CPU 202, Memory 206, OS 208, local firmware (not shown) and local storage (not shown). LPAR 201 also includes virtual I/O adapters 211 and application 216. LPAR 201 includes a respective host operating system (e.g., OS 208) that controls low-level access to hardware layer (260) of IHS 200 and/or to virtualized I/O functions and/or services. Similarly, LPAR 240 receives an allocation of specific virtualized hardware and OS resources, including virtualized allocations of CPU 242, Memory 246, OS 250, local firmware (not shown), and local storage (not shown). LPAR 240 also includes virtual I/O adapters 244 and application 248. The actual number of LPARs within IHS 200 may vary and could range from a single partition to hundreds or thousands of LPARS, without limitation. For efficiency in presenting the inventive concepts herein, only two clients are presented within IHS 200. IHS 200 provides a different verification platform to the verification platform of FIG. 1. As shown in FIG. 1, a separate verification server (represented by IHS 100) connects to the target IHS (140) to perform injection verification. However, IHS 200 enables an executable IVM to be installed and executed within a verification LPAR (201) of target IHS 200 in order to determine whether a key injection process was successfully performed. In one embodiment, verification code is installed within target IHS 140 to provide a local verification platform that executes on target IHS 140. In particular, the verification code is installed directly within the OS on target IHS 140. The local verification platform then determines whether key injection to inject an activation process key into BIOS 145 was successfully performed without requiring connectivity of target IHS 140 to an external IHS 100. In this embodiment, target IHS 140 operates as an independent, stand-alone IHS similar to an operation of IHS 200. However, in this embodiment, target IHS 140 operates without configuring virtual machines or logical partitions as the configuration of IHS 200 provides. In one embodiment, verification LPAR 201 comprises injection verification module (IVM) 118C which LPAR 201 executes to perform injection verification to determine whether an activation process key was successfully injected into IHS 200.

Those of ordinary skill in the art will appreciate that the hardware, firmware/software utility, and software components and basic configuration thereof depicted in FIGS. 1 and 2 may vary. The illustrative components of IHS 100/200 are not intended to be exhaustive, but rather are representative to highlight some of the components that are utilized to implement certain of the described embodiments. For example, different configurations of an IHS may be provided, containing other devices/components, which may be used in addition to or in place of the hardware depicted, and may be differently configured. The depicted example is not meant to imply architectural or other limitations with respect to the presently described embodiments and/or the general invention.

FIGS. 1 and 2 collectively provide two different configurations for providing a platform that can be utilized to determine whether key injection was successfully performed on a target IHS. Further description of the IVM 118 used to perform injection verification is primarily provided with reference to FIG. 1. Referring again to FIG. 1, in one embodiment, key injection module (KIM) 116 initiates a key injection procedure to inject into an information handling system at least one activation process key to support one of an automated system activation and a manual system activation. To support the automated system activation process, IVM 118 performs the key injection procedure to inject a DPK into a Basic Input/Output System (BIOS) of an information handling system. To support the manual system activation process, IVM 118 performs the key injection procedure to inject a default key into an OS image of an information handling system. In response to completion of the initiated key injection procedure, key injection module 116 stores a copy of a selected character sequence of each activation process key utilized in the key injection procedure.

Injection verification module (IVM) 118 initiates an injection verification to determine whether the key injection procedure completed successfully. IVM 118 securely performs the injection verification to determine whether the key injection procedure successfully injected an activation process key into the information handling system by utilizing the selected character sequence of the activation process key, without requiring a full identification of the activation process key. The selected character sequence comprises a last N character of a DPK, where N is less than a total number of characters in a complete activation process key (e.g., N=5) is an integer value.

In one embodiment, IVM 118 sends a request to OS image 155 of a selected information handling system to identify a character sequence that can be reported by the OS image 155. In response to successful transmission of the request to OS image 155, IVM 118 receives from OS image 155 a report providing a limited character sequence of one of: (a) a successfully injected unique DPK; (b) an injected default DPK when an associated unique DPK was not successfully injected; and (c) an injected default key to support the manual activation process.

IVM 118 compares the stored copy of a selected character sequence for a unique digital product key (DPK) to a character sequence reported by OS image 155 on a selected information handling system (e.g., target IHS 140) on which key injection to support automated system activation was performed. In response to the stored copy of the selected character sequence for the unique DPK matching the reported character sequence, IVM 118 identifies the selected information handling system as a "passing" system on which the key injection procedure was successfully performed. In response to the stored copy of the selected character sequence for the unique DPK not matching the reported character sequence, IVM 118 identifies the selected information handling system as a "failing" system on which the key injection procedure was not successfully performed.

In response to the reported character sequence not matching the copy of the selected character sequence of the unique DPK, IVM 118 determines whether the reported character sequence matches a copy of a selected character sequence of a default activation process key corresponding to the unique DPK that was utilized to perform the key injection. The default activation process key corresponding to the unique DPK is used to indicate that the DPK activation process is to be triggered. In response to the reported character sequence matching the copy of the selected character sequence of the default activation process key corresponding to the unique DPK, IVM 118 attributes a failing system status of the information handling system to a mismatch error in which a unique DPK of a target OS product does not match the reported character sequence. In addition, in one embodiment, IVM 118 triggers the key injection module to re-configure the selected information handling system to successfully inject a unique DPK corresponding to a target OS product identified by the matching, selected character sequence of the default DPK.

In response to the reported character sequence not matching the copy of the selected character sequence of the default DPK, IVM 118 attributes a failing system status of the information handling system to at least one of (i) an inaccuracy in generation of a DPK copy and (ii) a key injection issue associated with an inability to properly inject the unique DPK. In one embodiment, IVM 118 triggers the key injection module to re-configure the selected information handling system to successfully inject a new DPK.

In one embodiment, IVM 118 initiates verification by selecting an information handling system on which to perform the injection verification. IVM 118 then determines whether a first key injection to support an automated activation process or a second key injection to support a manual process was performed on the selected information handling system. In response to determining that the key injection that supports the automated activation process was performed on the selected information handling system, IVM 118 retrieves, from an OS image report, the character sequence from a DPK injected within the BIOS of the selected information handling system. IVM 118 then determines whether the character sequence reported by the OS image matches the copy of the selected character sequence of the unique DPK that was utilized to perform the key injection.

In response to determining that the key injection that supports the manual activation process was performed on the selected information handling system, IVM 118 retrieves, from an OS image report, a selected character sequence of a default key injected within the operating system image of the selected information handling system. IVM 118 determines whether the character sequence reported by the OS image matches a copy of a selected character sequence of a default key that was utilized to perform key injection to support the manual activation process. Specifically, IVM 118 compares the reported character sequence to a stored copy of a selected character sequence of the default key for manual activation of a corresponding OS product. In response to the reported character sequence matching the stored copy of the selected character sequence of the default key for manual activation of the corresponding OS product, IVM 118 identifies the selected information handling system as a system properly configured for manual activation using a Certificate of Authentication (COA). In response to the reported character sequence not matching the stored copy of the selected character sequence of the default key for manual activation of the corresponding OS product, IVM 118 identifies the selected information handling system as a system on which the performed key injection procedure to support the manual activation process failed. In one embodiment, IVM 118 triggers the key injection module to re-configure the selected information handling system to successfully inject the default key for manual activation.

Figure 3:
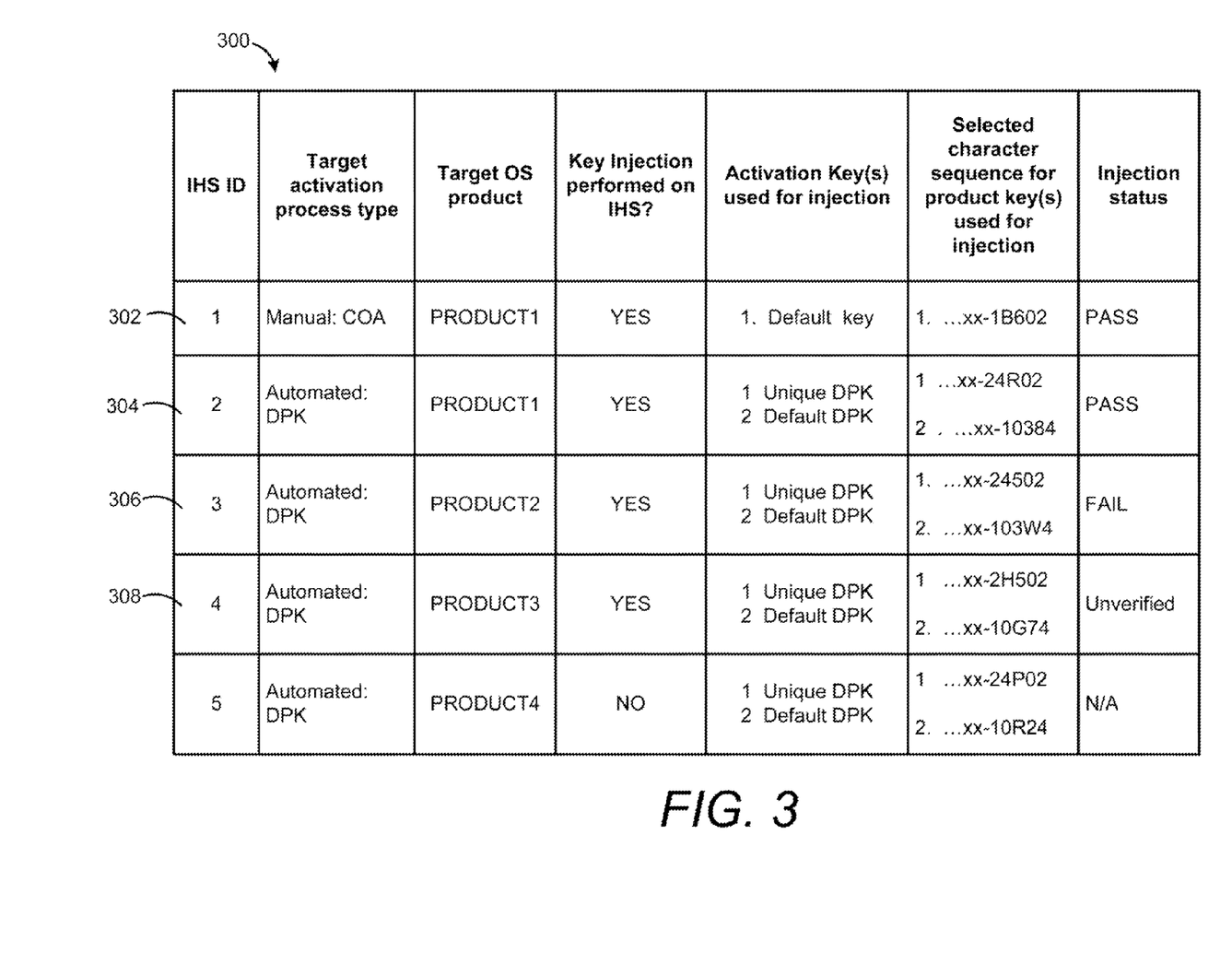
FIG. 3 is a table providing activation key injection information for a number of target information handling systems, in accordance with one or more embodiments.

FIG. 3 is a table providing activation key injection information for a number of target information handling systems (IHS), according to one embodiment. Table 300 provides information that can be used during a verification process to determine whether an activation process key was successfully injected during a key injection procedure performed on a target IHS. More particularly, table 300 can be used to determine whether a target IHS is properly configured prior to initiating shipment of the target IHS to a customer or should be tagged for re-configuration using a key injection procedure. The first column of table 300 provides an identification (ID) for each target IHS. The second column identifies, for a corresponding target IHS, the target process type from among a manual process using a certificate of authentication (COA) or an automated process provided and supported by an original equipment manufacturer (OEM) DPK configuration process. The third column identifies a target operating system product, such as "Product 1" or "Product 2", for a corresponding target IHS. The fourth column indicates whether a key injection procedure for a particular target IHS was performed, and the type(s) of activation process key(s) utilized in the key injection procedure is identified in the fifth column. A selected character sequence for a product key(s) used during key injection is provided in the sixth column. The seventh column indicates whether the key injection procedure for a particular target IHS was successfully performed.

Referring specifically to first row 302 of table 300, key injection information for target IHS #1 is provided. As first row 302 indicates, the manual activation process is the target activation process type for activation of Product 1 (i.e., the target OS product) within IHS #1. The key injection successfully injected a default key identified by "xx-1B602" (i.e., the selected character sequence of the injected default key) within IHS #1. Second row 304 indicates that the automated DPK activation process is the target activation process type for activation of Product 1 (i.e., the target OS product) within IHS #2. The key injection successfully injected a digital process key (DPK) identified by "xx-24R02" (i.e., the selected character sequence of the injected DPK) within IHS #2. In one embodiment, a default key is also utilized during the key injection process to indicate (during activation) whether an automated or manual activation process is utilized for target IHS 140. Second row 304 indicates an example embodiment in which the key injection successfully injected a default key identified by "xx-10384" within IHS #2.

Third row 306 indicates that the automated DPK activation process is the target activation process type for activation of Product 2 (i.e., the target OS product) within IHS #3. Third row 306 further indicates that the key injection procedure to inject a DPK identified by "xx-24502" within IHS #3 was not successfully performed. Third row 306 indicates an example embodiment in which key injection was performed but failed to successfully inject a default key identified by "xx-103W4" within IHS #3. Fourth row 308 indicates that an injection procedure to support an automated activation process was performed on IHS #4. However, fourth row 308 further indicates that IVM 118 has not yet verified whether key injection was successfully performed.

In one embodiment, in order to determine whether key injection was successfully performed, IVM 118 compares a copy of the selected character sequence for a unique DPK retrieved from storage with the activation process key that the OS reports. In response to the stored copy of the selected character sequence for the unique DPK matching the reported character sequence, IVM 118 identifies the selected information handling system as a "passing" system on which the key injection procedure was successfully performed. In response to the stored copy of the selected character sequence for the unique DPK not matching the reported character sequence, IVM 118 identifies the selected information handling system as a "failing" system on which the key injection procedure was not successfully performed. IVM 118 appropriately updates the key injection status information in column 7 for a corresponding target information handling systems (IHS) to indicate whether the key injection procedure was successfully performed.

Figure 4:
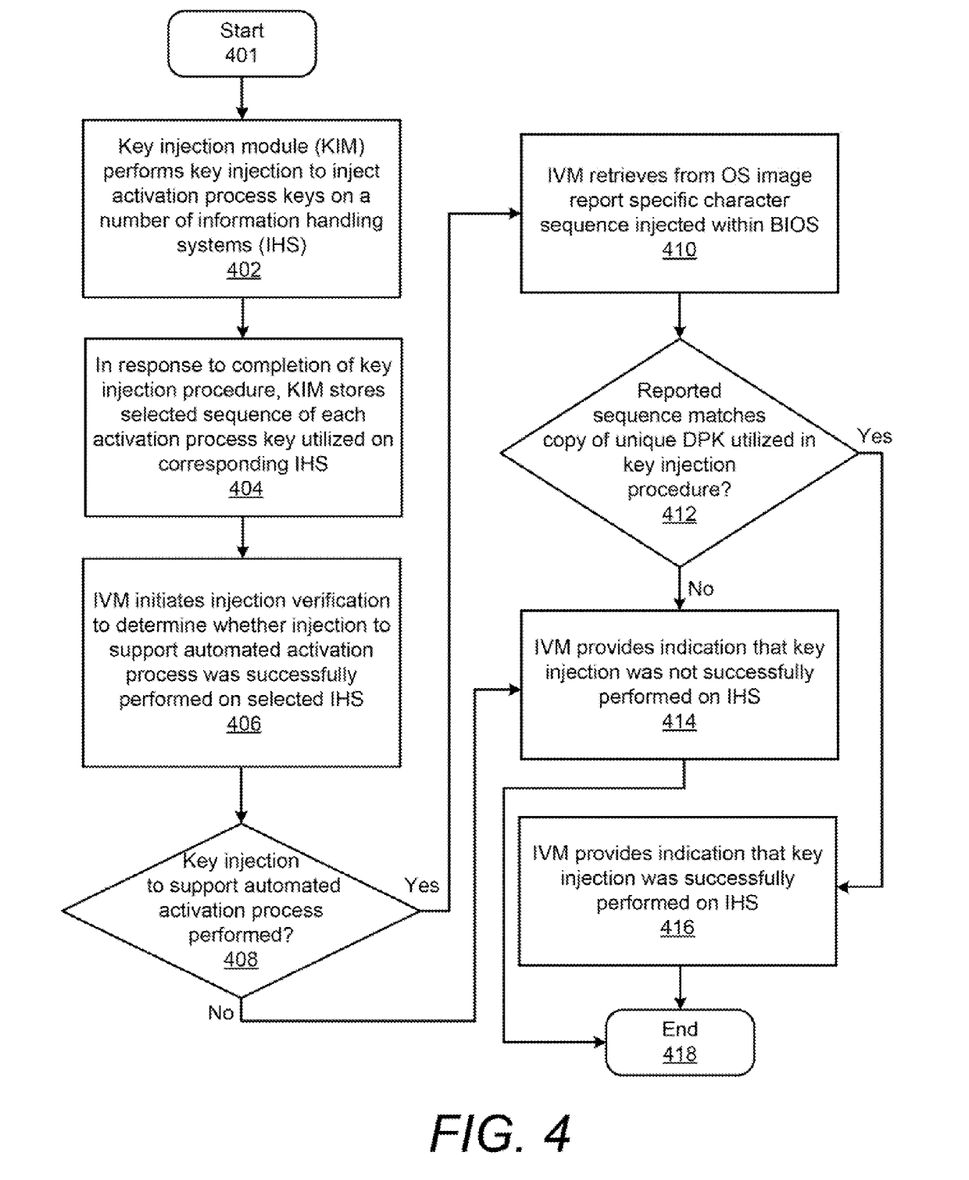
FIG. 4 is a flow chart illustrating a method for determining whether key injection to support an automated Digital Product Key (DPK) activation process was successfully performed on a selected IHS, in accordance with one or more embodiments.
Figure 5:
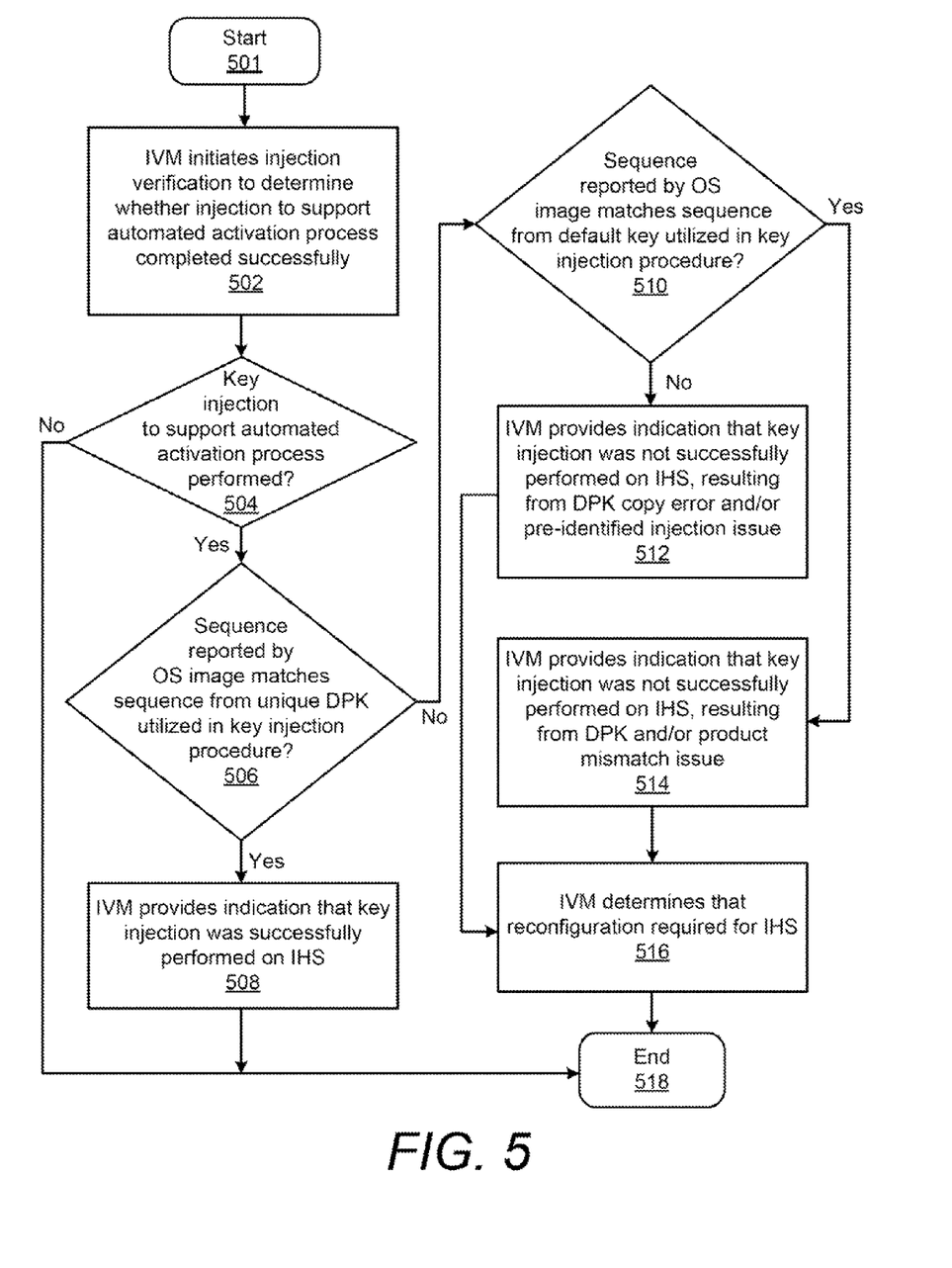
FIG. 5 is a flow chart illustrating a method for determining whether key injection to support an automated DPK activation process was successfully performed on a selected IHS and identifying a reason for a detected error, in accordance with one or more embodiments.
Figure 6:
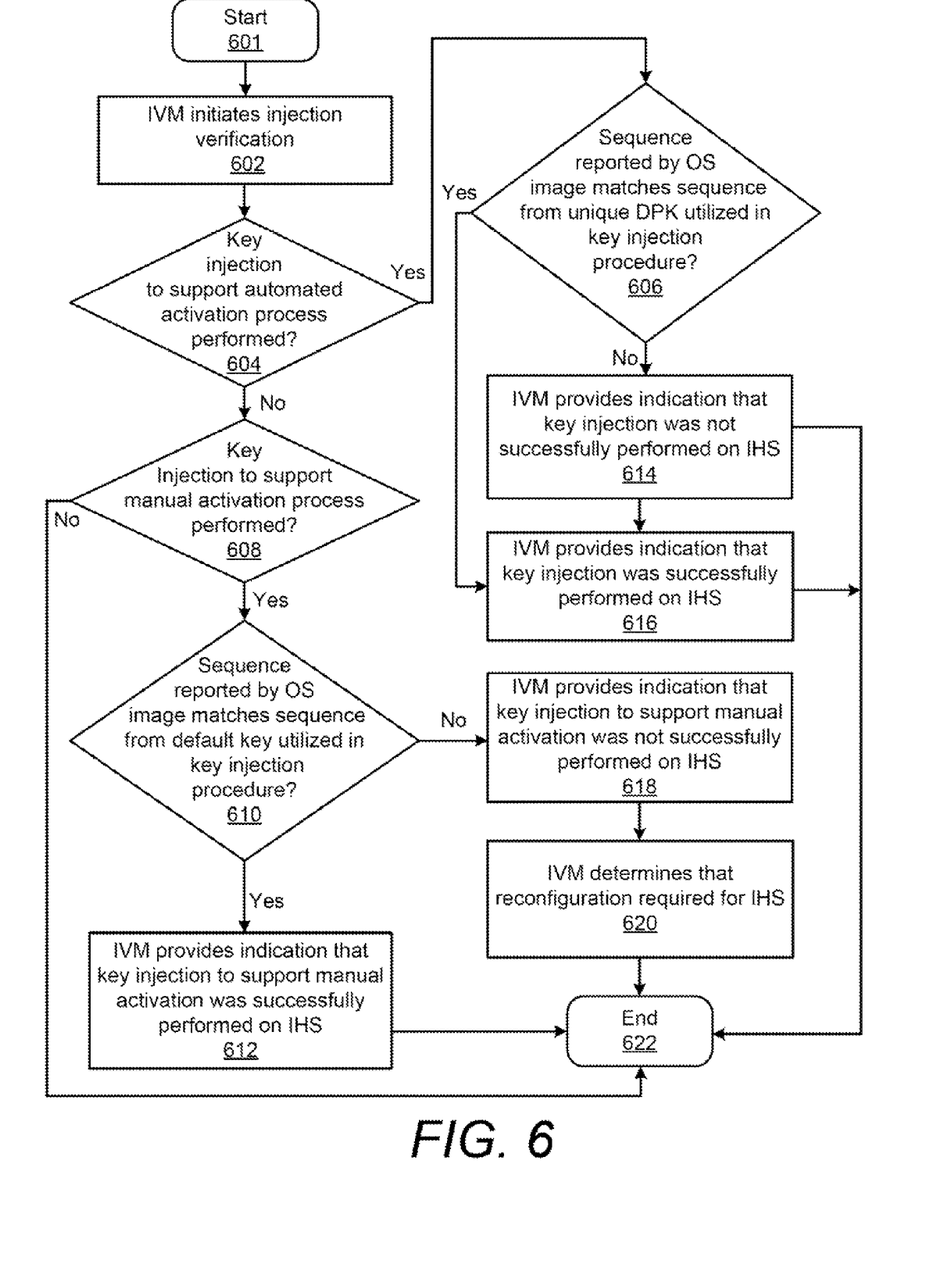
FIG. 6 is a flow chart illustrating a method for determining whether key injection was successfully performed on a selected IHS, in accordance with one or more embodiments.

FIG. 4, FIG. 5 and FIG. 6 present flowcharts illustrating example methods by which IHS 100 presented within the preceding figures performs different aspects of the processes that enable one or more embodiments of the disclosure. Generally, method 400, method 500 and method 600 collectively represent methods that determine whether a key injection process to support an automated DPK process or a manual process was successfully performed. The description of each method is provided with general reference to the specific components illustrated within the preceding figures. Generally each method is described as being implemented via execution of IVM 118A within an external IHS 100, IVM 118B on a target IHS 140, or execution of IVM 118C on a logical partition within target IHS 200. It is, however, appreciated that certain aspects of the described methods may be implemented via other processing devices and/or execution of other code. In the discussion of FIG. 4, FIG. 5 and FIG. 6, reference is also made to elements described in FIG. 1-FIG. 3.

FIG. 4 illustrates an example method for determining whether key injection to support an automated DPK activation process was successfully performed. Method 400 begins at the start block 401 and proceeds to block 402 where key injection module (KIM) 116 performs a key injection procedure to inject a unique digital product key (DPK) on at least one information handling system (IHS). At block 404, in response to completion of the key injection procedure, KIM 116 stores a selected sequence of each activation process key (i.e., at least one of a unique DPK and a default key) utilized on a corresponding IHS. In one embodiment, KIM 116 updates table 300 to indicate that the key injection procedure was completed for a particular IHS. At block 406, injection verification module (IVM) 118 initiates injection verification to determine whether injection to support automated activation process was successfully performed on a selected IHS (e.g., target IHS 140). At decision block 408, IVM 118 determines whether key injection to support an automated activation process was performed on the selected IHS. In one embodiment, IVM 118 retrieves IHS configuration data 110 which may be provided via table 300 to determine whether key injection to support an automated activation process was performed on the selected target IHS 140. In response to determining that key injection to support an automated activation process was performed, IVM 118 retrieves, from an OS image report, a specific character sequence injected within the BIOS (e.g., BIOS 145) as shown at block 410. In response to determining that key injection to support an automated activation process was not performed, IVM 118 provides an indication or notification that key injection was not successfully performed on target IHS 140, as shown at block 414. At decision block 412, IVM 118 determines whether the reported sequence matches the copy of the unique DPK utilized in the key injection procedure. In response to determining that the reported sequence does not match the copy of the unique DPK utilized in the key injection procedure, IVM 118 provides an indication that key injection was not successfully performed on target IHS 140, as shown at block 414. In response to determining that the reported sequence matches the copy of the unique DPK utilized in the key injection procedure, IVM 118 provides an indication that key injection was successfully performed on the selected IHS, as shown at block 416. The process ends at block 418.

FIG. 5 illustrates an example method for determining whether key injection to support an automated DPK activation process was successfully performed and identifies a reason for a detected error. Method 500 begins at the start block 501 and proceeds to block 502 where IVM 118 initiates injection verification to determine whether injection to support an automated DPK activation process was completed successfully. At decision block 504, IVM 118 determines whether key injection to support an automated activation process was performed on the selected IHS. In response to determining that key injection to support an automated activation process was performed on the selected IHS, IVM 118 determines whether the sequence reported by the OS image matches the selected character sequence from the unique DPK utilized in key injection procedure, as shown at decision block 506. In response to determining that the sequence reported by OS image matches the selected character sequence from the unique DPK utilized in key injection procedure, IVM 118 provides an indication that the key injection procedure was successfully performed on the selected IHS, as shown at block 508.

In response to determining that the sequence reported by the OS image does not match the selected character sequence from the unique DPK, IVM 118 determines whether the sequence reported by the OS image matches the sequence from a default key utilized in a key injection procedure, as shown at decision block 510. In response to determining that the sequence reported by the OS image does not match the selected character sequence from the default key, IVM 118 provides an indication that the key injection was not successfully performed on the selected IHS as a result of a DPK replication error and/or a key injection process issue, since neither the selected character sequence of the DPK nor the selected character sequence of the default key matches the reported sequence, as shown at block 512. In response to determining that the sequence reported by the OS image matches the selected character sequence from the default key, IVM 118 provides an indication that key injection was not successfully performed on the selected IHS because of a DPK mismatch issue, since the reported sequence matches the selected character sequence of the default key (instead of the selected character sequence of the DPK), as shown at block 514. At block 516, in one embodiment, IVM 118 determines that reconfiguration is required to properly inject a unique DPK into the selected IHS. The process ends at block 518.

FIG. 6 illustrates an example method for determining whether key injection to support an automated DPK activation process or a manual activation process was successfully performed. Method 600 begins at the start block 601 and proceeds to block 602 where IVM 118 initiates injection verification. At decision block 604, IVM 118 determines whether key injection to support an automated activation process was performed on the selected IHS. In response to determining that key injection to support an automated activation process was not performed on the selected IHS, IVM 118 determines whether key injection to support a manual activation process was performed on the selected IHS, as shown at decision block 608. In response to determining that key injection to support the manual activation process was performed on the selected IHS, IVM 118 determines, at decision block 610, whether the sequence reported by OS image matches the sequence from the default key utilized in the key injection procedure.

In response to determining that the sequence reported by OS image matches the sequence from the default key utilized in key injection procedure, IVM 118 provides an indication that key injection to support manual activation was successfully performed on the selected IHS, as shown at block 612. In response to determining that the sequence reported by OS image does not match the sequence from the default key utilized in key injection procedure, IVM 118 provides an indication that key injection to support manual activation was not successfully performed on the selected IHS, as shown at block 618. At block 620, IVM 118 determines that reconfiguration is required to properly inject a unique DPK into the selected IHS.

Referring again to decision block 604, in response to determining that key injection to support an automated activation process was performed on the selected IHS, IVM 118 determines whether the sequence reported by the OS image matches the selected character sequence from the unique DPK utilized in the key injection procedure, as shown at decision block 606. In response to determining that the sequence reported by OS image does not match the selected character sequence from the unique DPK utilized in key injection procedure, IVM 118 provides an indication that the key injection procedure was not successfully performed on the selected IHS, as shown at block 614. In response to determining that the sequence reported by OS image matches the selected character sequence from the unique DPK utilized in key injection procedure, IVM 118 provides an indication that the key injection procedure was successfully performed on the selected IHS, as shown at block 616. The process ends at block 622.

In the above described flow charts, one or more of the methods may be embodied in a computer readable device containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A method for determining whether an activation process key which is used for activation of an operating system (OS) product is successfully injected into an information handling system, the method comprising:

initiating a key injection procedure to inject into an information handling system at least one activation process key to support one of an automated system activation and a manual system activation;

in response to completion of the initiated key injection procedure, storing a copy of a selected character sequence of each activation process key utilized in the key injection procedure; and initiating an injection verification to determine whether the key injection procedure completed successfully, said initiating said injection verification comprising securely performing the injection verification to determine whether the key injection procedure successfully injected an activation process key into the information handling system by utilizing the selected character sequence of the activation process key and without fully identifying the activation process key, and said initiating the injection verification further comprising:

comparing the stored copy of a selected character sequence for a unique digital product key (DPK) to a character sequence reported by an OS image on a selected information handling system on which key injection to support automated system activation was performed; and in response to the stored copy of the selected character sequence for the unique DPK matching the reported character sequence, identifying the selected information handling system as a "passing" system on which the key injection procedure was successfully performed.

2. The method of claim 1, wherein said initiating the injection verification further comprises:

in response to the stored copy of the selected character sequence for the unique DPK not matching the reported character sequence, identifying the selected information handling system as a "failing" system on which the key injection procedure was not successfully performed.

3. The method of claim 2, further comprising:

in response to the reported character sequence not matching the copy of the selected character sequence of the unique DPK, determining whether the reported character sequence matches a copy of a selected character sequence of a default DPK corresponding to the unique DPK that was utilized to perform the key injection;

in response to the reported character sequence matching the copy of the selected character sequence of the default DPK corresponding to the unique DPK that was utilized to perform the key injection: attributing a failing system status of the information handling system to a mismatch error in which a unique DPK of a target OS product was not injected; and indicating that a re-configuration of the selected information handling system can be used to successfully inject a unique DPK corresponding to a target OS product identified by the matching, selected character sequence of the default DPK; and in response to the reported character sequence not matching the copy of the selected character sequence of the default DPK: attributing a failing system status of the information handling system to at least one of a DPK replication error and a key injection issue associated with an inability to properly inject the unique DPK; and indicating that a re-configuration of the selected information handling system can be used to successfully inject the unique DPK.

4. The method of claim 1, wherein said initiating the injection verification further comprises:

selecting an information handling system on which to perform the injection verification;

determining whether a first key injection to support an automated activation process or a second key injection to support a manual process was performed on the selected information handling system; and in response to determining that the key injection to support the automated activation process was performed on the selected information handling system: retrieving from an OS image report the character sequence from a DPK injected within the BIOS of the selected information handling system; and determining whether the character sequence reported by the OS image matches the copy of the selected character sequence of the unique DPK that was utilized to perform the key injection.

5. The method of claim 4, further comprising:

in response to determining that the key injection to support the manual activation process was performed on the selected information handling system: retrieving from an OS image report a selected character sequence of a default key injected within the operating system image of the selected information handling system; and determining whether the character sequence reported by the OS image matches a copy of a selected character sequence of a default key that was utilized to perform key injection to support the manual activation process.

6. The method of claim 5, further comprising:

comparing the reported character sequence to a stored copy of a selected character sequence of the default key for manual activation of a corresponding OS product;

in response to the reported character sequence matching the stored copy of the selected character sequence of the default key for manual activation of the corresponding OS product, identifying the selected information handling system as a system properly configured for manual activation using a Certificate of Authentication (COA); and in response to the reported character sequence not matching the stored copy of the selected character sequence of the default key for manual activation of the corresponding OS product: identifying the selected information handling system as a system on which the performed key injection procedure to support the manual activation process failed; and indicating that a re-configuration of the selected information handling system can be used to successfully inject the default key for manual activation.

7. The method of claim 1, further comprising:

sending a request to an OS image of a selected information handling system to identify a character sequence that can be reported by the OS image; and in response to successful transmission of the request to the OS image, receiving from the OS image a report providing a limited character sequence of one of (a) a successfully injected unique DPK, (b) an injected default DPK when an associated unique DPK was not successfully injected and (c) an injected default key to support the manual activation process.

8. The method of claim 1, further comprising:

performing the key injection procedure to inject at least one activation process key into a Basic Input/Output System (BIOS) of the information handling system.

9. The method of claim 1, wherein:

the selected character sequence comprises a last N characters of a DPK, where N is an integer value.

10. The method of claim 1, wherein:

the automated activation process is an Original Equipment Manufacturer (OEM) DPK activation process.

11. An information handling system comprising:

at least one processor;

at least one memory system comprising an operating system (OS) image and a Basic Input/Output System (BIOS);

a key injection module that: initiates a key injection procedure to inject into an information handling system at least one activation process key to support one of an automated system activation and a manual system activation; and in response to completion of the initiated key injection procedure, stores a copy of a selected character sequence of each activation process key utilized in the key injection procedure; and a key injection verification module that initiates an injection verification to determine whether the key injection procedure completed successfully, said initiating said injection verification comprising securely performing the injection verification to determine whether the key injection procedure successfully injected an activation process key into the information handling system by utilizing the selected character sequence of the activation process key and without fully identifying the activation process key, and to initiate said injection verification, the injection verification module:

compares the stored copy of a selected character sequence for a unique digital product key (DPK) to a character sequence reported by an OS image on a selected information handling system on which key injection to support automated system activation was performed; and in response to the stored copy of the selected character sequence for the unique DPK matching the reported character sequence, identifies the selected information handling system as a "passing" system on which the key injection procedure was successfully performed.

12. The information handling system of claim 11, wherein the injection verification module:

in response to the stored copy of the selected character sequence for the unique DPK not matching the reported character sequence, identifies the selected information handling system as a "failing" system on which the key injection procedure was not successfully performed.

13. The information handling system of claim 12, wherein the injection verification module:
  in response to the reported character sequence not matching the copy of the selected character sequence of the unique DPK, determines whether the reported character sequence matches a copy of a selected character sequence of a default DPK corresponding to the unique DPK that was utilized to perform the key injection;
  in response to the reported character sequence matching the copy of the selected character sequence of the default DPK corresponding to the unique DPK that was utilized to perform the key injection: attributes a failing system status of the information handling system to a mismatch error in which a unique DPK of a target OS product was not injected; and indicates that a re-configuration of the selected information handling system can be used to successfully inject a unique DPK corresponding to a target OS product identified by the matching, selected character sequence of the default DPK; and
  in response to the reported character sequence not matching the copy of the selected character sequence of the default DPK: attributes a failing system status of the information handling system to a DPK replication error and a key injection issue associated with an inability to properly inject the unique DPK; and indicates that a re-configuration of the selected information handling system can be used to successfully inject the unique DPK.

14. The information handling system of claim 11, wherein the injection verification module:
  selects an information handling system on which to perform the injection verification;
  determines whether a first key injection to support an automated activation process or a second key injection to support a manual process was performed on the selected information handling system; and
  in response to determining that the key injection to support the automated activation process was performed on the selected information handling system: retrieves from an OS image report the character sequence from a DPK injected within the BIOS of the selected information handling system; and determines whether the character sequence reported by the OS image matches the copy of the selected character sequence of the unique DPK that was utilized to perform the key injection.

15. The information handling system of claim 14, wherein the injection verification module:
  in response to determining that the key injection to support the manual activation process was performed on the selected information handling system: retrieves from an OS image report a selected character sequence of a default key injected within the operating system image of the selected information handling system; and determines whether the character sequence reported by the OS image matches a copy of a selected character sequence of a default key that was utilized to perform key injection to support the manual activation process.

16. The information handling system of claim 15, wherein the injection verification module:
  compares the reported character sequence to a stored copy of a selected character sequence of the default key for manual activation of a corresponding OS product;
  in response to the reported character sequence matching the stored copy of the selected character sequence of the default key for manual activation of the corresponding OS product, identifies the selected information handling system as a system properly configured for manual activation using a Certificate of Authentication (COA); and
  in response to the reported character sequence not matching the stored copy of the selected character sequence of the default key for manual activation of the corresponding OS product: identifies the selected information handling system as a system on which the performed key injection procedure to support the manual activation process failed; and indicates that a re-configuration of the selected information handling system can be used to successfully inject the default key for manual activation.

17. The information handling system of claim 11, wherein the injection verification module:
  sends a request to an OS image of a selected information handling system to identify a character sequence that can be reported by the OS image; and
  in response to successful transmission of the request to the OS image, receives from the OS image a report providing a limited character sequence of one of (a) a successfully injected unique DPK, (b) an injected default DPK when an associated unique DPK was not successfully injected and (c) an injected default key to support the manual activation process.

18. The information handling system of claim 11, wherein the key injection module:
  performs the key injection procedure to inject at least one activation process key into a Basic Input/Output System (BIOS) of the information handling system.

19. The information handling system of claim 11, wherein:
  the selected character sequence comprises a last N characters of a DPK, where N is an integer value.

20. The information handling system of claim 11, wherein:
  the automated activation process is an Original Equipment Manufacturer (OEM) DPK activation process.

* * * * *